9298X
B. Hamblett,
Brick Machine.
Patented Dec. 28, 1835.
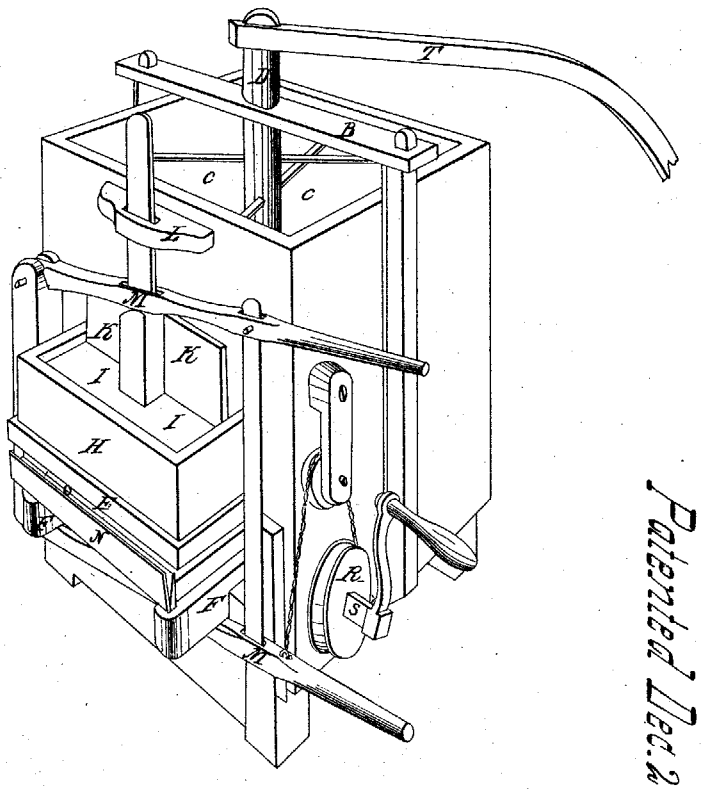
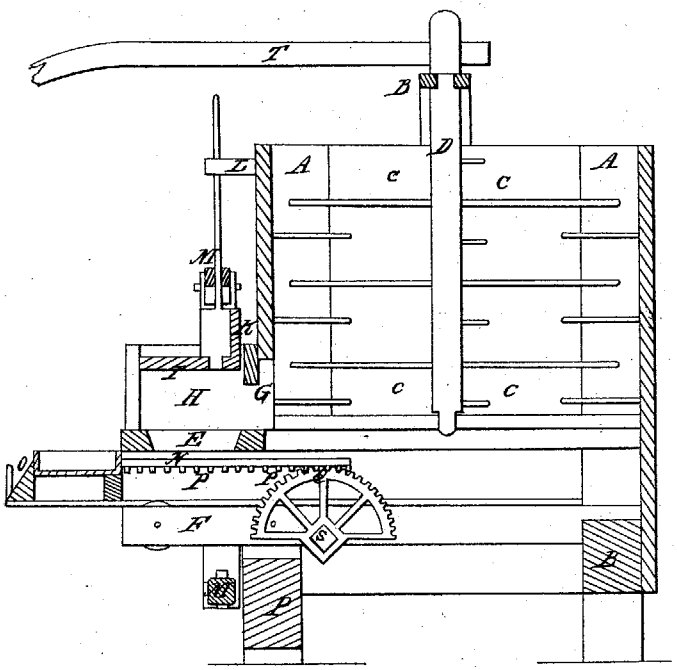
AM. PHOTO-LITHO. CO. N.Y. (OSBORNE'S PROCESS.)

Benjamin Hamblet Portland Maine

Letters Patent

The schedule referred to in these Letters Patent and making part of the same containing a description in the words of the said Benjamin Hamblet himself of his improvement in the machine for making bricks and Tile To all to whom these presents shall come Be it known that I the said Benjamin Hamblet of Portland in the County of Cumberland & State of Maine have invented a new and useful improvement in the manner of making and constructing machines for making mortar and striking the same into bricks & tiles by Horse power or any other power and that the following is a full & exact description of the construction and operation of the said machine as invented and improved by me — 1. I make a frame five & half feet high & three & half feet square for striking four bricks in a mould & four feet square for striking six Bricks in a mould. I have three sets of girts one near the top middle and bottom. Then I plank it all round & spike them in strong. On the middle girts I lay one cross girt from right to left. On these girts I lay a flooring of Plank which makes the bottom of the mortar pit. In the center of this floor. I make a round hole four inches deep and four inches diameter to receive the lower gudgeon of the grinding shaft. Then I lay another cross girt from ~~the~~ right to ~~the~~ left on the upper set of girts and make a large hole through it direct ly over the hole in the bottom through which I pass the grinding shaft. In two or more of the sides I set in a row of stout wooden pins horizontally four inches more or less apart from the bottom to near the top. These pins may be eighteen inches long more or less. Or this mortar Box & frame may be made in two parts. The bottom part of it in which the striking apparatus is placed may be about two feet high. The posts of timber six by six more or less with two sets of girts. The upper tier of girts whereon the floor of the mortar box is placed should be flush with 9298x the top of the posts. The timbers which make the place for the false moulds should be put under these girts. The travel ways for the carriage should be on the lower tier of girts. Then the upper part or the frame for the mortar box may be made of joists of the same bigness as the lower part & planked all round. & set on the under part and fastened on by strong hasps or spiked on. The bigness of it may be regulated as above described according to the number of bricks to be struck at a time 2. Then I have a strong shaft which I set perpendicularly in the mortar Box. the lower gudgeon standing in the mortice aforesaid and the upper end passing up through the cross girt about two feet above it. This shaft is set with two rows of pins horizontally & cross wise and long enough to reach nearly across the mortar Box, and as the shaft turns round these pins pass between the pins aforesaid set in the sides of the box & thereby the morter is ground & made for the Bricks. On the top of this shaft a sweep is framed after the common manner of the cyder Mill by which a horse turns the machine — 3. In front of the bottom an opening is made about four inches deep and a little longer than the length of the brick moulds through which the morter passes from the mortar box to fill the moulds, as the bricks are struck by the operation of the machine. 4. On the underside of the girts on which the floor of the mortar box is laid I put in two timbers four inches square more or less as may be necessary & fasten them on strong. These two timbers should project out in front about one foot and have a like piece framed into the ends. These two timbers should be about two feet apart when four bricks are struck at once & about three feet apart when six bricks are struck at once. In this way the place is made for the false moulds through which the mortar is forced into the brick moulds. This place for the false moulds is made bevelling all round and the false moulds are made bevelling so as exactly to suit. By this bevel shape the false moulds are kept in their place. These timbers also serve to confine the carriage on the upper side which carries the moulds in and out when striking & making bricks.

5. These false moulds or tubes, have four or six openings according to the number of Bricks the moulds carry and corresponding nearly in size with the brick moulds but a little smaller all round. The open
ings in the false moulds in each aperture should be bevelling on each
side & end upwards so as to hold the morter from dropping down when
the brick moulds are passing in and out. — 6. I make three sides
of a crib or box of Plank eight inches high which stands round the ap
erture (No 4.) in which the false moulds are placed and is a little
larger than that aperture. the two inner ends of the before named pieces
of this crib pass into two mortices in the front side of the morter box.
This crib receives the morter from the morter box aforesaid through the
opening in front of the morter box ready to be forced down through the
false moulds into the brick moulds & may properly be called the receiv
er. This crib is kept in its place by two strong pins standing in front of
it or by hasps — 7. A dasher or follower works in this receiver
made as follows. A thick piece of plank is fitted to the size of this
receiver. Then another piece of plank six inches wide more or less is
put edgewise upon the follower & flush with inner edge. This part of
the dasher when the dasher is down closes the opening in front by which
the morter passes from the morter box into the receiver when the mor
ter is not wanted; and this is done every time the dasher is pressed
down to fill the moulds. And when the dasher is raised the aperture is open
ed and the mortar again let into the receiver. and so on continually.
Close to the upright part of this dasher in the middle a piece of plank
ten inches wide is framed in with a tenon at each edge and may be
about three feet long. The upper end of the handle passes through a guide
to keep the motion steady & perpendicular. The handle of this dasher also
passes loose through a mortice in the lever which works it & works in
this mortice on a pin 8. On the left side of the machine in front a loose post stands per-
pendicular. three feet eight inches long more or less & is put loose on
to a stout pin in that corner post of the machine.

9. The left end of the upper lever is set loose in a mortice in the upper
end of this loose post & held in by a pin. This lever reaches horizontally
across the machine and about two feet beyond. When the machine is

9298X in operation the dasher is worked up and down by this leaver & another.
The other leaver is put into a looz mortice in the lower end of the looz
post aforesaid and held in by a pin in the same manner that the other
leaver is & runs parallel with below the carriage aforesaid & may be of
the same length with the upper leaver. These leavers are connected together
on the right side of the receiver by a piece of wood 4 by 1 inches & paral
lel with the two post aforesaid. this piece which I call a hauling brace
passes looz through a mortice in each leaver & is held in each mor
tice by a pin. The use of this leaver is to tread upon with the foot
in bring down the dasher, in filling the moulds with mortar which
is much easier than to press the upper one down with the hand. Both
can be used together if necessary — 10 — Two pieces of joist are fastened
onto the lower guts for ways for the carriage to travel in and out on
when the machine is in operation. Two friction Rollers are set in each gut
with vee shaped edges. These ways must be so placed as to bring the
upper side of the carriage & moulds close under the false moulds so as to strike
the upper sides of the bricks. — 11. Then I make a carriage to travel
on the ways aforesaid three feet long & two & quarter feet wide when four
brick are struck at a time & three feet wide when six bricks are struck at
a time. This carriage is made of two pieces of plank set up edgewise &
two feet of the back part of the carriage is floored over with boards: The way
pieces and floor should be five inches thick. These way pieces should
come right over the friction Rollers (No. 10.) Then cast iron ways
with a vee grooving should be let into these wooden ways so as to come
directly over those friction Rollers & travel on them when the carriage
travels in and out. The front part of this carriage should be cut down
enough to let the brick mould & strike board in flush with the floor. The
plan should be about ten inches wide. Then a small trough should
be made in front of the moulds into which to wipe the clay when strikin
The use of the flooring of the back part of the carriage is to keep the mor
tar from saging down while the carriage is running in and out. On
the underside of this flooring a cast iron toothed rack one & a half
feet long is placed and fastened on.

12. The Cog Wheel eighteen inches diameter more or less which works into the
rack aforesaid is put on an iron shaft of proper size say 1½ inch square. This
shaft goes across the machine from right to left behind the front posts & rests
on an iron box on each post. The right end of this shaft comes out about
ten inches beyond the machine and has a crank fitted onto it by which it
is worked when the Wheel runs the carriage in and out. A pulley is put on
to this shaft close up to the machine seventeen inches in diameter. A nut
on the left end of this shaft holds it from slipping edgewise
13. A Rope is fastened to this pulley passes over another pulley upon
the side of the machine & the other end goes down & is fastened onto the
lower leaver. The use of this rope is to raise the follower when the moulds
are run out and thereby to open the receiver so that it may be filled with
mortar and ready for the next filling of the moulds.
14. I have now described the several parts of my machine aforesaid & their
operation. I do not claim the whole as my own invention. though it was
necessary to describe them all in order to describe what I claim as my own
invention and describe the operation of the whole machine. The parts which
I claim are the following. The improvement on the dasher by working
it and steadying it by the staff & the guide through which the handle passes.
The box post and the leavers & the manner of connecting them together and
with the staff and their operations; The manner of connecting the
shaft of the cog wheel & the leavers with the rope passing up over the pul
ley. The application of the rack and cog Wheel to the carriage to move it
out and in. The method moulding and striking the bricks crosswise in
stead of length wise which preserves the bricks in better shape than the
mould and strike them lengthwise & they may be struck either way.
To the other parts of the machine I lay no claim except to use
them with those that I do claim
15. A flat piece of wood should be laid on the left front post so as to
bring the box post forward a little and a flat piece of wood should
also be laid onto the right front post for the leavers to bear against
as they move up and down. 16. The use of the line attached to the
pulley on the shaft of the cog wheel and passing over the pulley on the

9298X right side of the right [illegible] front post & down to the lower lever is to raise the dasher when the carriage is run out. Style may be made in this machine by altering the shape of the moulds and false moulds. In testimony that the above is a true specification of my said improvement as above described I have hereunto set my Hand this twenty ninth day of April in the year of our Lord One thousand Eight hundred and thirty five Witnesses
Jonathan Morgan
Daniel Hamblet Benj Hamblet.

2352 [illegible]

4.6
Ch.J.W.

(Drawing)

(Patented Decr 28th 1835)